US008572593B2

(12) United States Patent
    Vedula

(10) Patent No.: US 8,572,593 B2
(45) Date of Patent: Oct. 29, 2013

(54) SIMPLIFYING DETERMINATION OF WHETHER APPLICATION SPECIFIC PARAMETERS ARE SETUP FOR OPTIMAL PERFORMANCE OF ASSOCIATED APPLICATIONS

(75) Inventor: Venkata Naga Ravikiran Vedula, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 1118 days.

(21) Appl. No.: 11/853,036

(22) Filed: Sep. 11, 2007

(65) Prior Publication Data

US 2009/0037824 A1    Feb. 5, 2009

(30) Foreign Application Priority Data

Jul. 30, 2007   (IN) ............................ 1650/CHE/2007

(51) Int. Cl.
    *G06F 9/44*      (2006.01)
    *G06F 9/45*      (2006.01)
(52) U.S. Cl.
    USPC ........... 717/153; 717/121; 717/127; 717/150; 717/152; 717/154
(58) Field of Classification Search
    None
    See application file for complete search history.

(56) References Cited

U.S. PATENT DOCUMENTS

| 5,062,055 | A  | * | 10/1991 | Chinnaswamy et al. | 702/182 |
|-----------|----|----|---------|--------------------|---------|
| 6,059,842 | A  | * | 5/2000  | Dumarot et al.     | 717/153 |
| 6,701,364 | B1 | * | 3/2004  | Meyer              | 709/224 |
| 6,766,458 | B1 | * | 7/2004  | Harris et al.      | 726/6   |
| 6,901,582 | B1 | * | 5/2005  | Harrison           | 717/127 |
| RE38,865  | E  | * | 11/2005 | Dumarot et al.     | 717/153 |
| 7,216,261 | B2 | * | 5/2007  | Schilf             | 714/39  |
| 7,784,027 | B2 | * | 8/2010  | Harrison           | 717/113 |
| 7,865,888 | B1 | * | 1/2011  | Qureshi et al.     | 717/168 |
| 7,870,550 | B1 | * | 1/2011  | Qureshi et al.     | 717/174 |
| 2002/0066088 | A1 | * | 5/2002 | Canut et al.      | 717/151 |
| 2003/0229890 | A1 | * | 12/2003 | Lau et al.       | 717/168 |
| 2004/0226010 | A1 | * | 11/2004 | Suorsa           | 717/174 |
| 2005/0097517 | A1 | * | 5/2005  | Goin et al.      | 717/124 |

\* cited by examiner

*Primary Examiner* — Isaac Tecklu
(74) *Attorney, Agent, or Firm* — Narendra Reddy Thappeta

(57) ABSTRACT

Simplifying determination of whether application specific parameters are setup for optimal performance of associated applications. In an embodiment, a monitor program associated with an application specific parameter is identified and executed to cause retrieval of a current value of the parameter. The retrieved current value is then compared with a recommended value for the parameter to determine whether the parameter is setup for optimal performance of the application. The result of comparison may be displayed to the user. Another aspect provides for downloading of the recommended values and the monitor programs associated with application specific parameters from an external system (such as a vendor system). One more aspect enables the user to execute a correction program to correct the value of the parameter for optimal performance of the application.

26 Claims, 10 Drawing Sheets

```
521: <parameters application="E-Business Suite">
522:    <parameter name="OutdatedOrders" group="Database">
523:       <description>
524:          Percentage of the number of orders in the system that are more than 3 year old.
525:          If the percentage is more than the recommeded level, the older orders should be taken
526:          into offline mode using the functionality provided in the application.
527:       </description>
528:       <impact>  Order search will become very slow  </impact>
529:       <recommeded minimum="0%" maximum="10%" tolerance="5%"/>
530:       <monitor id="OrderMonitor" location="http://www.acme.com/monitors/Orders.jar" />
531:    </parameter>
532:    <parameter name="InternalSessionCacheSize" group="Memory">
533:       <description>
534:          Size of a cache in-memory that stores data frequently accessed by users in a session
535:          as a percentage of the size of the data stored in the database.
536:       </description>
537:       <impact> Performance of order creation depends on session info </impact>
538:       <recommeded minimum="25%" maximum="40%" tolerance="5%"/>
539:       <monitor id="SessionMonitor" location="http://www.acme.com/monitors/SessionCache.jar">
540:          <input name="CacheUrl" type="URL" label="Cache URL" />
541:       </monitor>
542:    </parameter>
543:    <parameter name="UsersPerServer" group="MidtierTopology">
544:       <description>
545:          Number of users serviced by each server in the midtier. It is necessary that
546:          1 mid tier system (2 GB RAM, 100GB hard disk ) exists for every 2000 users
547:       </description>
548:       <impact> Will impact performance of the application as a whole </impact>
549:       <monitor id="MidTierMonitor" location="http://www.acme.com/monitors/Topology.jar"/>
550:    </parameter>
551:    <parameter name="SectionsPerCategory" group="Database" >
552:       <description>
553:          Number of sections present under each category of the catalog in the database
554:       </description>
555:       <impact>
556:          Too many sections under the same category will result in larger loading times
557:          during listing of the categories in the catalog
558:       </impact>
559:       <recommeded minimum="1" maximum="25" tolerance="5"/>
560:       <monitor id="CategoryMonitot" location="http://www.acme.com/monitors/Catalog.jar">
561:          <input name="DbName" type="Text" label="Database User Name" />
562:          <input name="DbPwd" type="Password" label="Database Password" />
563:          <input name="DbUrl" type="URL" label="Database Server URL" />
564:       </monitor>
565:    </parameter>
566: </parameters>
```

*FIG. 5*

```
611: public class CategoryMonitor implements GenericMonitor {

612:   public void doVerification(MonitorArgs args) {
613:     String dbname = args.get("DbName"),
614:     String dbpwd = args.get("DbPwd");
615:     String dburl = args.get("DbUrl");

616:     int min = args.get("Minimum");
617:     int max = args.get("Maximum");
618:     int tol = args.get("Tolerance");

619:     String query = "select count(sect_name) as X, cat_name from cat_sect" +
                                       "group by cat_name where X > " + (max+tol);
620:     Statement stmt = DriverManager.getConnection(dbname, dbpwd, dburl).createStatement();
621:     ResultSet rs = stmt.execute(query);

622:     while (rs.next()) {
623:       MonitorFailure mf = new MonitorFailure("SectionsPerCategory");
624:       mf.id = rs.get("cat_name");
625:       mf.message = "Category has more than " + (max+tol) + " sections";
626:       mf.currentValue = rs.get("X");
627:       mf.recommendedValue = max;
628:       mf.recommendedAction = "Split the category into multiple categories " +
                                       "(each having less than " + max + " sections";
629:       MonitorStatus.addFailure(mf);
630:     }
631:   }

632:   public void doCorrection(MonitorArgs args, MonitorFailure mf) {
633:     String dbname = args.get("DbName");
634:     String dbpwd = args.get("DbPwd");
635:     String dburl = args.get("DbUrl");

636:     Statement stmt = DriverManager.getConnection(dbname, dbpwd, dburl).createStatement();
637:     ResultSet rs = stmt.execute("select sect_name from cat_sect where cat_name = " + mf.id);

638:     int count = 0, parts = 1;
639:     string newcat = mf.id + "-" + parts;
640:     while(rs.next()){
641:       AppDatabase.Catalog.moveSection(rs.get("sect_name"), mf.id, newcat);
642:       count++;
643:       if (count == mf.recommendedValue) {
644:         count = 0; parts++;
645:         newcat = mf.id + "-" + parts;
646:       }
647:     }
648: }
```

FIG. 6

SIMPLIFYING DETERMINATION OF WHETHER APPLICATION SPECIFIC PARAMETERS ARE SETUP FOR OPTIMAL PERFORMANCE OF ASSOCIATED APPLICATIONS

RELATED APPLICATION

The present application is related to and claims priority from the co-pending India Patent Application entitled, "SIMPLIFYING DETERMINATION OF WHETHER APPLICATION SPECIFIC PARAMETERS ARE SETUP FOR OPTIMAL PERFORMANCE OF ASSOCIATED APPLICATIONS", Serial Number: 1650/CHE/2007, attorney docket number: ORCL-059, Filed: Jul. 30, 2007, naming the same inventor Venkata Naga Ravikiran Vedula as in the subject patent application, and is incorporated in its entirety herewith.

BACKGROUND

1. Technical Field

The present disclosure relates to system performance and more specifically to simplifying determination of whether application specific parameters are setup for optimal performance of associated applications.

2. Related Art

An application refers to a software program, which on execution performs specific desired tasks. In general, applications are executed in a run-time environment containing operating systems, virtual machines (e.g., supporting Java™ programming language), device drivers, etc., as is well known in the relevant arts.

There are various application specific parameters associated with an application. An application specific parameter relates to the use of one or more resources (either shared with other applications or otherwise) by the associated application. These parameters generally tend to be specific to the implementation of application. For example, an enterprise application may require an administrator to specify various parameters such as the number of requests that can be serviced by a server in the enterprise application, the amount of data to be cached by the application, etc.

Application specific parameters are distinguished from system specific parameters in that system specific parameters relate to the shared usage of resources, potentially by multiple/all applications. Examples of system specific parameters include aggregate disk usage, total number of threads/processes executing in the run-time environment, etc.

An application may be operating with application specific parameters setup with a corresponding value (or values). The values may be set either due to configuration (e.g., by an administrator) or by various conditions occurring within the application during operation.

The performance of an application is often dependent on the values to which various application specific parameters are setup. The performance of an application may be characterized by measures such as the throughput rate (i.e., number of tasks/requests completed per unit time), response time, time outs, stability, etc. One set of values for a parameter may enhance the performance while another set of values may degrade the performance.

At least for such a reason, administrators/users of applications often spend substantial time/resources to check whether application specific parameters are setup for optimal performance of associated applications.

It is generally desirable to simplify determination of whether application specific parameters are setup for optimal performance of associated applications.

BRIEF DESCRIPTION OF THE DRAWINGS

Example embodiments of the present invention will be described with reference to the accompanying drawings briefly described below.

FIG. 5 depicts a portion of a configuration data (forming the basis for the display of FIGS. 4A-4C) specifying information associated with application specific properties of an application in an embodiment.

FIG. 6 depicts a portion of a monitor/correction program associated with an application specific parameter in an embodiment.

In the drawings, like reference numbers generally indicate identical, functionally similar, and/or structurally similar elements. The drawing in which an element first appears is indicated by the leftmost digit(s) in the corresponding reference number.

DESCRIPTION OF EXAMPLE EMBODIMENTS

1. Overview

Figure 1:
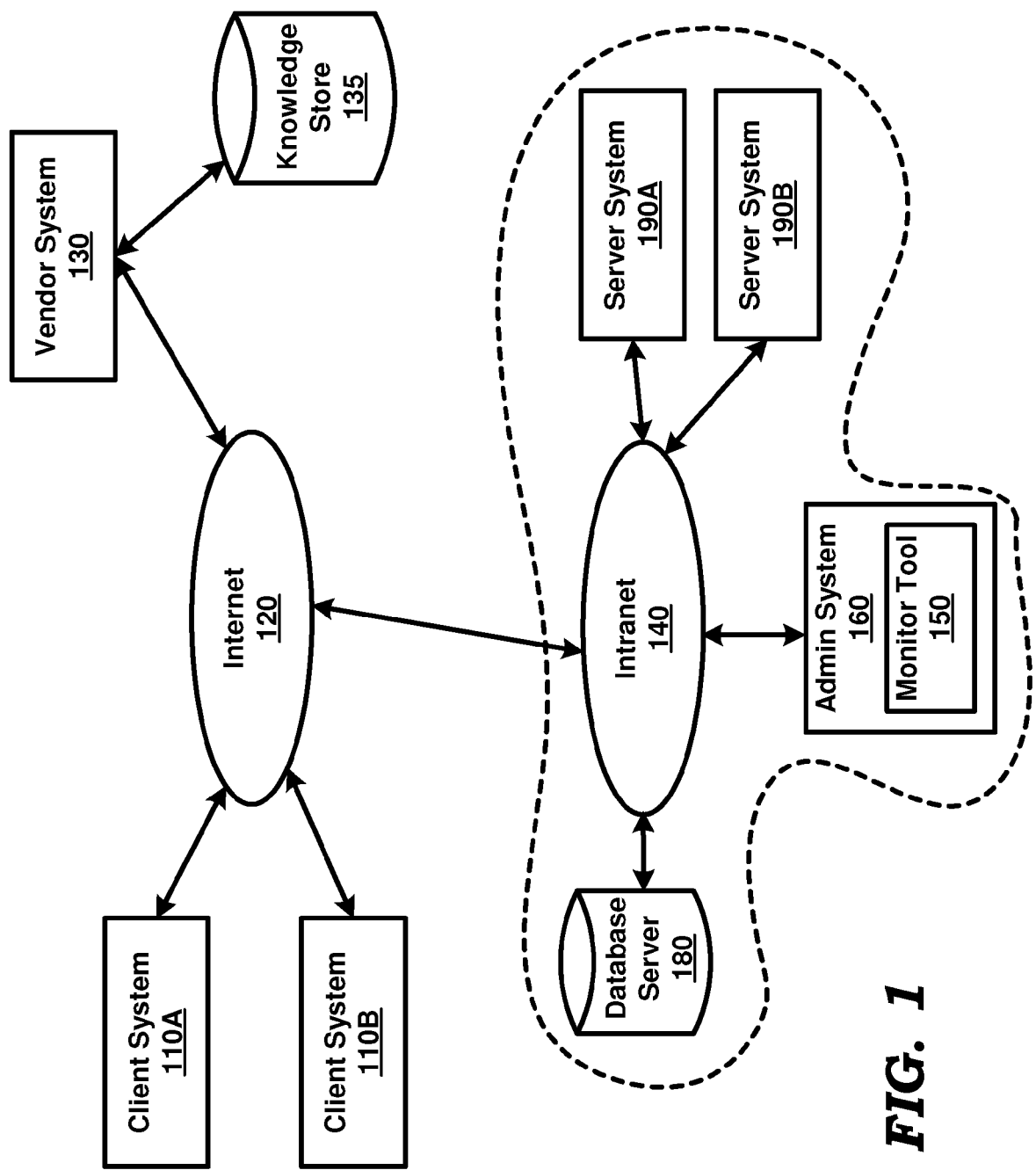
FIG. 1 is a block diagram illustrating an example computing system in which several aspects of the present invention can be implemented.

An aspect of the present invention simplifies the determination of whether an application is operating with application specific parameters setup for optimal performance of the application. In one embodiment, a monitor program, designed to retrieve a current value of an application specific parameter, is identified. The identified monitor program is executed to cause retrieval of the current value of the associated parameter. The retrieved current value is then compared with a recommended value for the parameter and the result of comparison is displayed on a display unit.

According to another aspect of the present invention, the recommended values and the monitor programs associated with the application specific parameters setup for an application are downloaded from an external system. In one embodiment, a vendor (who develops and/or sells) of the application provides the recommended values and monitor programs from a vendor system. As a result, a vendor (with possibly more knowledge from multiple sources) can dynamically provide accurate recommended values for comparison. In addition, the monitor programs can be tailored to specifically interface with the applications to retrieve any values available potentially via the applications alone.

Another aspect of the present invention displays data identifying monitor programs associated with the application specific parameters on a display unit. On the user selecting a monitor program, the selected monitor program is executed. A suitable interface may be provided to facilitate the user to provide any inputs required for such execution.

In one embodiment, the result of comparing a current value of an application specific parameter (setup for an application and retrieved by execution of an associated monitor program) with a recommended value indicates a success or a failure of comparison. The success result (only if the current value is within a tolerance of the recommended value) indicates that the parameter is setup to cause optimal performance of the application and the failure result indicates otherwise. The result may also specify a corrective measure to be implemented in the application if the result indicates failure.

One more aspect of the present invention indicates the availability of a correction program designed to perform a corrective measure when an application specific parameter is determined not to be setup for optimal performance of an application. On receiving an indication from a user, the correction program is executed to ensure that the corrective measure is implemented in the application, thereby ensuring that the parameter is setup to cause optimal performance of the application. By integrating such correction measures with detection measures, the management of the application environment is simplified.

According to yet another aspect of the present invention, a configuration data indicating monitor programs associated with each of the application specific parameters is maintained. The configuration data may be inspected to identify a monitor program to be executed. In one embodiment, the configuration data also specifies the recommended value for each of the application specific parameters.

Several aspects of the invention are described below with reference to examples for illustration. It should be understood that numerous specific details, relationships, and methods are set forth to provide a full understanding of the invention. One skilled in the relevant art, however, will readily recognize that the invention can be practiced without one or more of the specific details, with other methods, or combining one more aspects/features described herein, etc. In other instances, well-known structures or operations are not shown in detail to avoid obscuring the features of the invention.

2. Example Environment

FIG. 1 is a block diagram illustrating an example computing system in which several aspects of the present invention can be implemented. The block diagram is shown containing client systems 110A-110B, internet 120, vendor system 130, knowledge store 135, intranet 140, admin system 160 (containing monitor tool 150), database server 180 and server systems 190A-190B.

Merely for illustration, only representative number/type of systems are shown in the Figure. Many environments often contain many more systems, both in number and type, depending on the purpose for which the environment is designed. Each system/device of FIG. 1 is described below in further detail.

Intranet 140 represents a network providing connectivity between server systems 190A-190B, database server 180 and admin system 160, all provided within an enterprise (shown with dotted boundaries). Internet 120 extends the connectivity of these with vendor system 130 and client systems 110A/110B. Each of intranet 140 and Internet 120 may be implemented using protocols such as Internet Protocol (IP) well known in the relevant arts.

Each of knowledge store 135 and database server 180 facilitates storage and retrieval of a collection of data. Database server 180 stores data used (generated or stored) by applications in processing various client requests. Knowledge store 135 stores software code representing various monitor/correction programs and recommended values downloaded by monitor tools, as described below in further detail. In one embodiment, each of knowledge store 135 and database server 180 is implemented using relational database technologies and therefore provides storage and retrieval of data using structured queries such as SQL.

Each of client system 110A-110B represents a system such as a personal computer, workstation, mobile station, etc., used by a user to generate (client) requests to software applications executing in server systems 190A-190B. The requests may be generated according to a suitable interface. In general, a client system requests an application for performing operations and receives corresponding responses containing the results of performance of the requested operations.

Vendor system 130 represents a server system facilitating vendors/providers to provide various monitor/correction programs used according to various aspects of the present invention. Vendor system 130 may also maintain recommended values (also provided to monitor tool 150) for application specific parameters in various configurations of corresponding applications in knowledge store 135. The monitor/correction programs and recommended values may be retrieved from knowledge store 135 before being forwarded to admin system 160.

Each of server systems 190A-190B represents a server, such as a web/application server, which executes software applications capable of performing operations requested by client systems 110A-110B. A server system may perform the operations on data maintained internally or on external data (stored in database server 180) and then send the result of performance of the operations to the requesting client system.

As noted above, server systems 190A-190B, database server 180 and admin system 160 (together with intranet 140 providing connectivity among the systems) may be implemented in a single "enterprise". As such, the combined systems (shown within the dotted area) may be executing an enterprise application, with the various tiers (or sub-applications) of the enterprise application being executed on the various systems such as server system 190A and database server 180. Alternatively, each server system may execute an independent application, which processes the corresponding requests received from the client systems.

The performance of applications (executing in server systems 190A-190B) may be dependent on application specific parameters. The parameters may be set with different sets of values, with one specific set of ("one or more") values (hereafter referred to as recommended values) causing the optimal performance of the application.

In one prior approach, a user/administrator determines whether the current values setup for the application specific parameters caused optimal performance of the application based on prior knowledge/experience, guides (such as administration guide, sizing guide, etc.) provided by a vendor of the application, etc. Such an approach requires the user/administrator to spend considerable amount of time and/or resources in determining whether the performance of an application is optimal.

Admin system 160 provided according to an aspect of the present invention enables determination of whether application specific parameters of applications executing on server systems 190A and 190B are setup with optimal values, and to optionally correct the values of the application specific parameters as described below with examples. In an embodiment, such features are operative by execution of software instructions constituting monitor tool 150, and accordingly the description below is provided with respect to monitor tool 150.

3. Determining Whether Parameters are Setup for Optimal Performance

Figure 2:
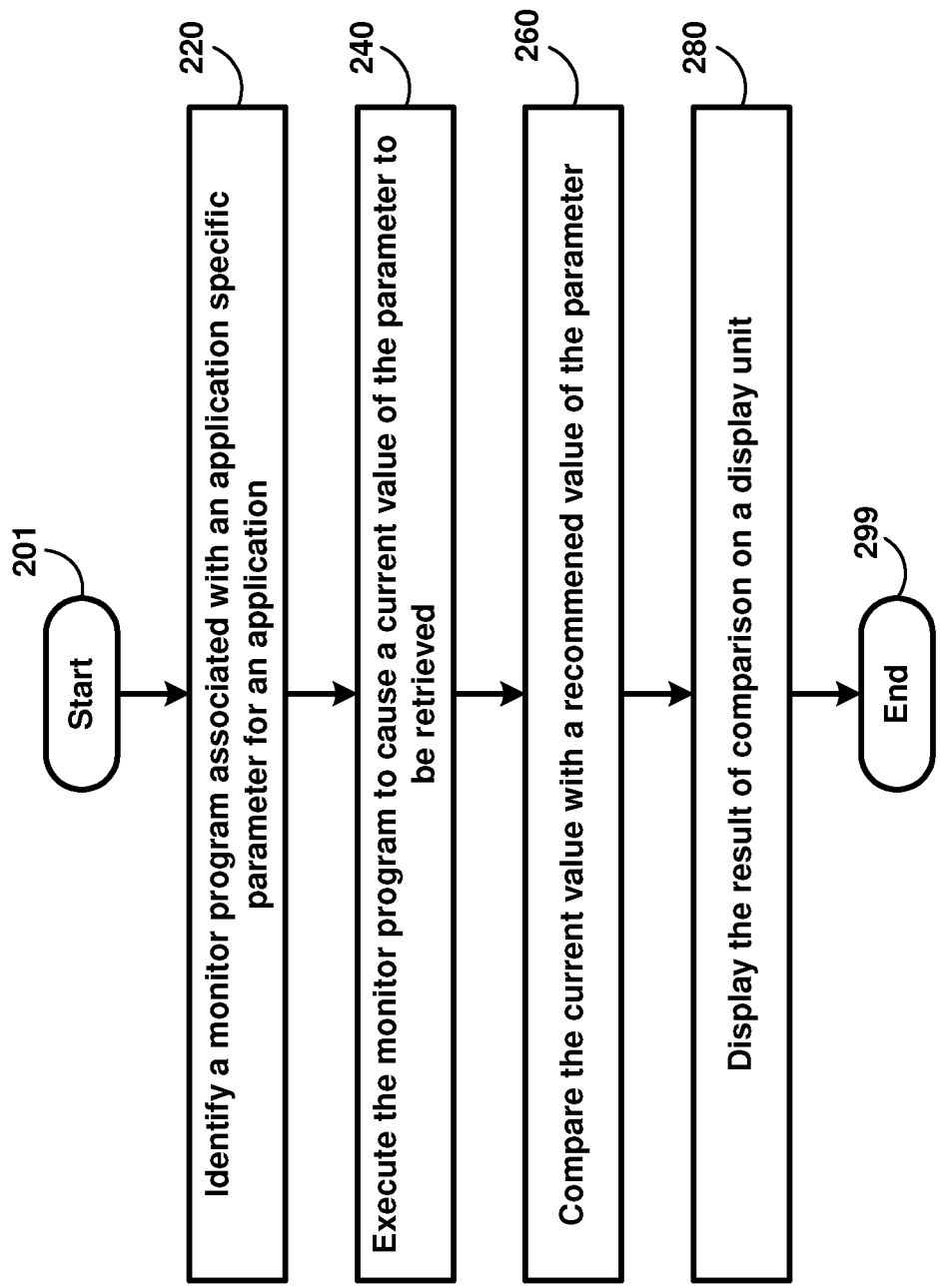
FIG. 2 is a flowchart illustrating the manner in which a determination of whether an application is operating with application specific parameters setup for optimal performance is performed according to an aspect of the present invention.

FIG. 2 is a flowchart illustrating the manner in which a determination of whether an application is operating with application specific parameters setup for optimal performance is performed according to an aspect of the present invention. The flowchart is described with respect to FIG. 1 merely for illustration. However, various features can be implemented in other environments also without departing from the scope and spirit of various aspects of the present invention, as will be apparent to one skilled in the relevant arts by reading the disclosure provided herein.

In addition, some of the steps may be performed in a different sequence than that depicted below, as suited in the specific environment, as will be apparent to one skilled in the relevant arts. Many of such implementations are contemplated to be covered by several aspects of the present invention. The flow chart begins in step 201, in which control immediately passes to step 220.

In step 220, monitor tool 150 identifies a monitor program associated with an application specific parameter for an application. The monitor program is designed to retrieve a current value of the application specific parameter. The identification of the monitor program associated with an application specific parameter may be performed in any desired manner. In one embodiment, a user is enabled to select the monitor program from a displayed set of monitor program as described in detail in below sections.

In step 240, monitor tool 150 executes the monitor program to cause a current value of the application specific parameter to be retrieved. In an embodiment, the monitor program represents a set of software instructions included/executed in monitor tool 150 or a piece of software code capable of executing external to (within or outside of admin system 160) the context of monitor tool 150 (or in an environment provided by monitor tool 150) and providing the retrieved value to monitor tool 150 according to a pre-specified convention (e.g., by inter-process communication, storing in a pre-specified memory location or by appropriate packet format on a network).

In step 260, monitor tool 150 compares the current value with a recommended value of the parameter. The recommended value may be provided by the monitor program or may be specified by a vendor of the application. It should be appreciated that the recommended values can be represented, for example, in the form of individual numbers or ranges, as suited for the specific application specific parameters. In the case of ranges, a boundary of the range may be used in comparisons, though other values in the range can also be used without departing from the scope and spirit of several aspects of the present invention. The comparison may be performed by the monitor program or by monitor tool 150 (after receiving the current value from the monitor program).

In step 280, monitor tool 150 displays the result of comparison on a display unit (not shown in FIG. 1) connected to server system 130. The flow chart ends in step 299.

Thus, a user/administrator may identify and execute monitor programs associated with desired application specific parameters and then inspect the results to determine whether the desired parameters are setup for optimal performance of the application. Accordingly, the process of determining whether application specific parameters are setup for optimal performance of the associated application is simplified for the users/administrators.

In a scenario where the result indicates that the desired parameters are not setup for optimal performance, it may be desirable that the parameters be set to values that cause optimal performance. An aspect of the present invention enables a user/administrator to change the current values of an application specific parameter to the recommended values such that optimal performance of the application is achieved as described below with examples. The approach of the examples also integrates such corrections with the determination of FIG. 2.

4. Correcting Parameters to Cause Optimal Performance

Figure 3:
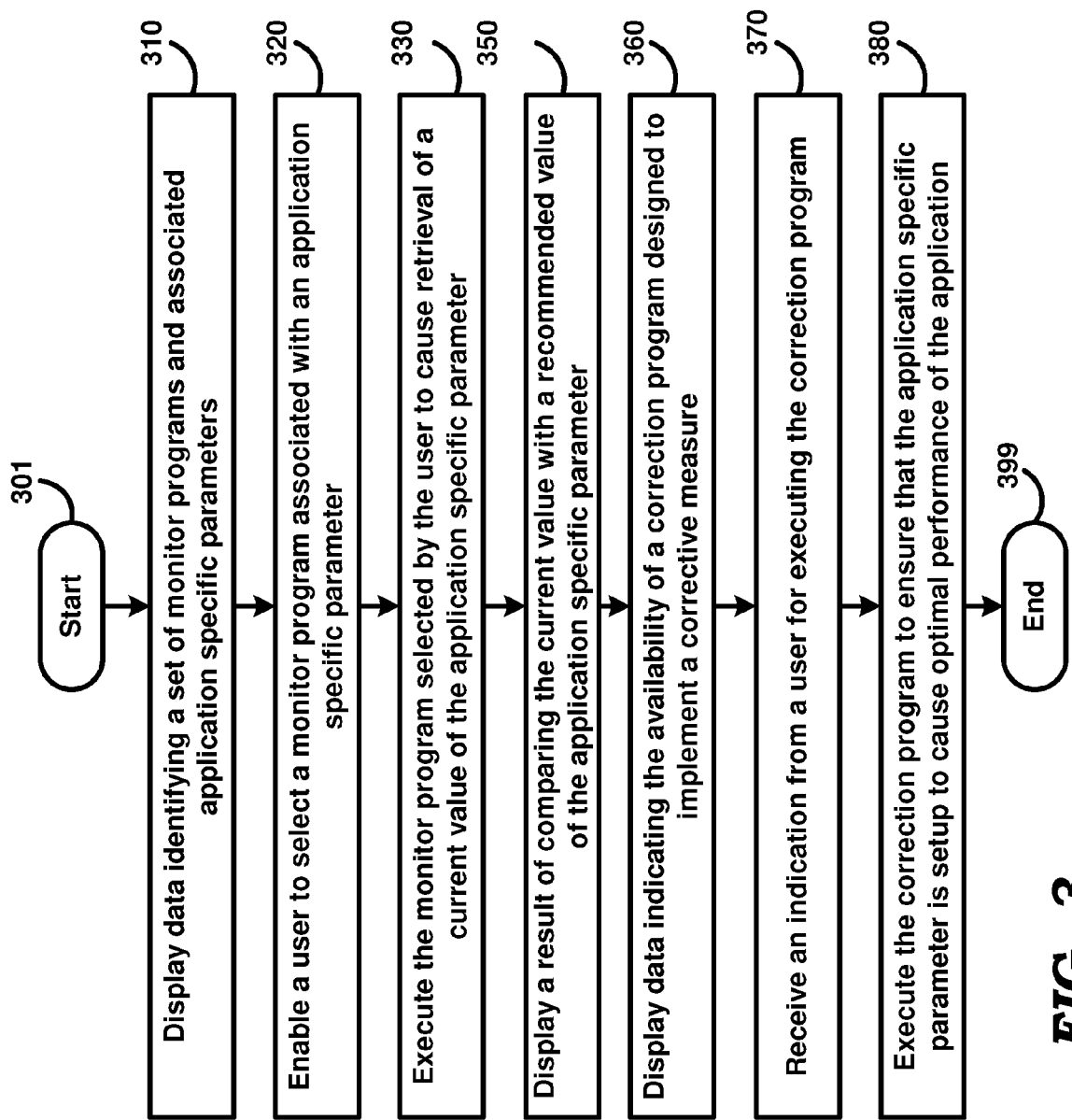
FIG. 3 is a flowchart illustrating the manner in which application specific parameters are setup with recommended values to cause optimal performance of an associated application according to an aspect of the present invention.

FIG. 3 is a flowchart illustrating the manner in which application specific parameters are setup with recommended values to cause optimal performance of an associated application according to an aspect of the present invention. The flowchart is described with respect to FIG. 1 merely for illustration. However, various features can be implemented in other environments also without departing from the scope and spirit of various aspects of the present invention, as will be apparent to one skilled in the relevant arts by reading the disclosure provided herein.

In addition, some of the steps may be performed in a different sequence than that depicted below, as suited in the specific environment, as will be apparent to one skilled in the relevant arts. Many of such implementations are contemplated to be covered by several aspects of the present invention. The flow chart begins in step 301, in which control immediately passes to step 310.

In step 310, monitor tool 150 displays data identifying a set of monitor programs and associated application specific parameters on a display unit. The monitor programs may be displayed in response to a request from a user/administrator using admin system 160 or one of server systems 190A-190B. The monitor programs may be displayed on a display unit connected to the requesting system.

In step 320, monitor tool 150 enables a user to select a monitor program associated with an application specific parameter. The selection of the monitor program of interest may be performed by selecting/clicking on a button/link displayed associated with each of the monitor programs. Other suitable approaches as provided by the corresponding I/O devices can also be used for the selection.

In step 330, monitor tool 150 executes the monitor program selected by the user to cause retrieval of a current value of the application specific parameter, for example, as described above with respect to step 240.

In step 350, monitor tool 150 displays a result of comparing the current value with a recommended value of the application specific parameter, for example, as described above with respect to step 260.

In one embodiment, the result indicates a success or failure of comparing the current value of the parameter with the recommended value of the parameter. A success may indicate that the application specific parameter is setup to cause optimal performance of the application and a failure may indicate otherwise. The result may indicate a success when the current value is within a tolerance level of the recommended value.

In the scenario where the result indicates a failure of comparison, the result may further specify a corrective measure to be implemented in the application to cause optimal performance. The corrective measure may be presented in the form of a sequence of actions that need to be performed to cause optimal performance of the application. The corrective measure may be performed manually by a user/administrator or may be performed using a correction program as described below.

In step 360, monitor tool 150 displays data indicating the availability of a correction program designed to implement a corrective measure. The corrective measure may also be implemented in the form of a set of software instructions included in monitor tool 150 or a piece of software code capable of executing independently (or in an environment provided by monitor tool 150). The software instructions or piece of software code is referred to as a "correction program". The correction program may implement the corrective measure in the application in any desired manner.

In a scenario that a correction program does not exist, the data may indicate the absence of the correction program. The user/administrator may then be required to perform the corrective measure manually.

In step 370, monitor tool 150 receives an indication from a user for executing the correction program. The user may select a button/link or send/speak a command to monitor tool 150 indicating that the correction program is to be executed.

In step 380, monitor tool 150 executes the correction program to ensure that the application specific parameter is setup to cause optimal performance of the application. In one embodiment, the parameter is set to the recommended value of the parameter thereby causing optimal performance. However, any corrective measure (e.g., reorganizing data as described in an example below), as needed to setup the application specific parameter to a recommended value, may be performed. The flow chart ends in step 399.

Though the execution of the correction program (in steps 360, 370 and 380) is depicted as being performed after the step of determination (steps 310, 320, 330 and 350), it may be appreciated that in alternative embodiments, the correction program may be executed independently of the step of determination. For example, a user/administrator on determining that a specific application specific parameter is not setup for optimal performance (based on the output of the application, error reports, etc.) may send a request for displaying correction programs associated with the specific parameter. The user/administrator may then select and execute an appropriate correction program (similar to steps 370 and 380) ensuring that the specific parameter is setup to cause optimal performance of the application.

Thus, a user/administrator may determine and change/correct the values of application specific parameters that have been indicated to be not setup for optimal performance of an application. The correction of the parameters ensures that the parameters are setup to cause optimal performance of the application. Some of the steps noted above are described below in further detail.

5. Identifying a Monitor Program

Figure 4A:
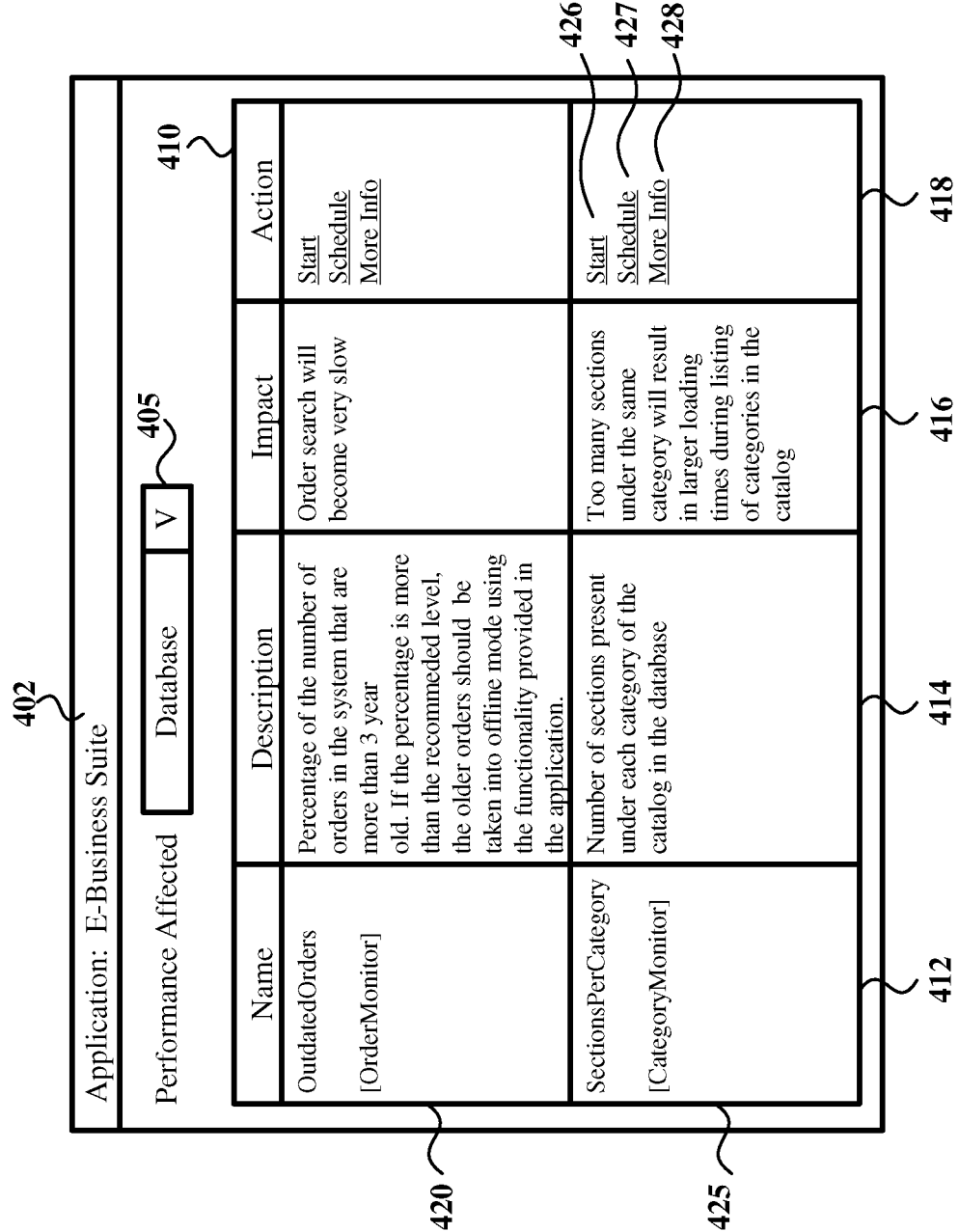
FIG. 4A depicts a portion of a screen enabling a user to select a monitor program for execution in one embodiment.

FIG. 4A depicts a portion of a screen enabling a user to select a monitor program for execution in one embodiment (which forms the basis for monitor tool 150 to identify the monitor program).

Figure 4B:
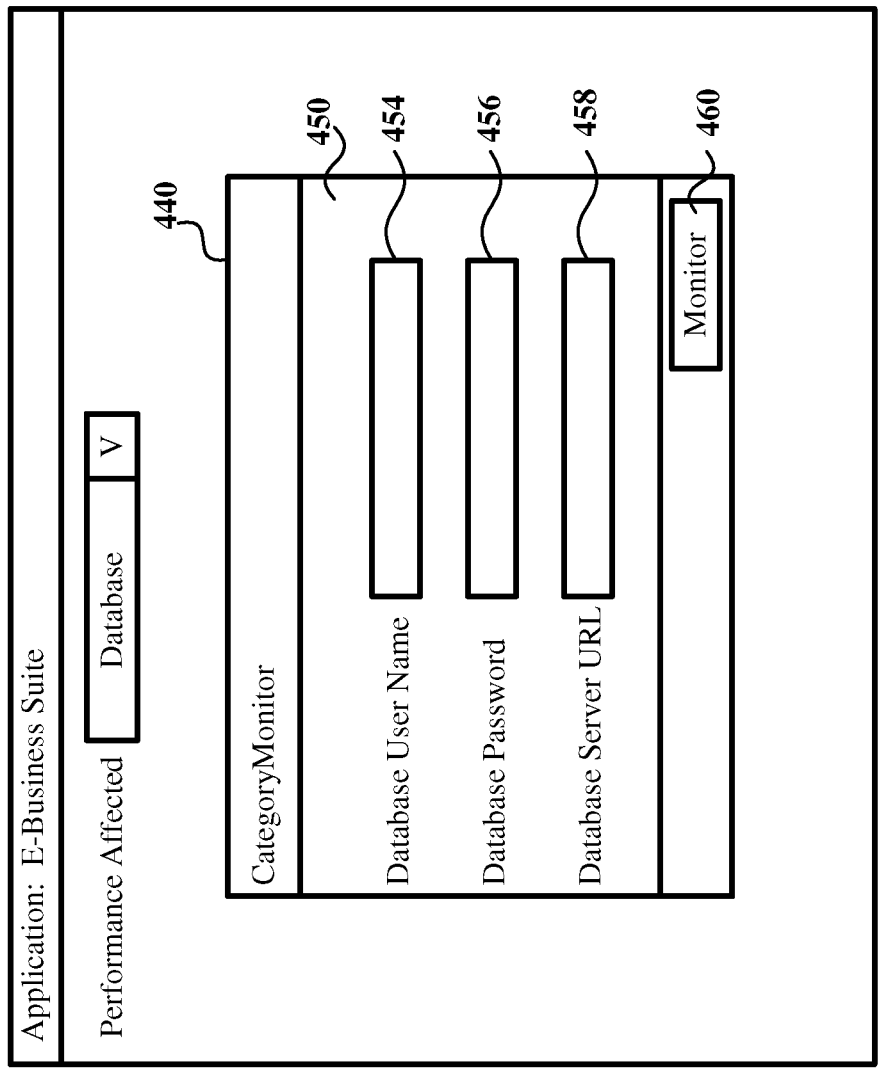
FIG. 4B depicts a portion of a screen enabling a user to specify values corresponding to inputs required for execution of a monitor program selected by a user in one embodiment.
Figure 4C:
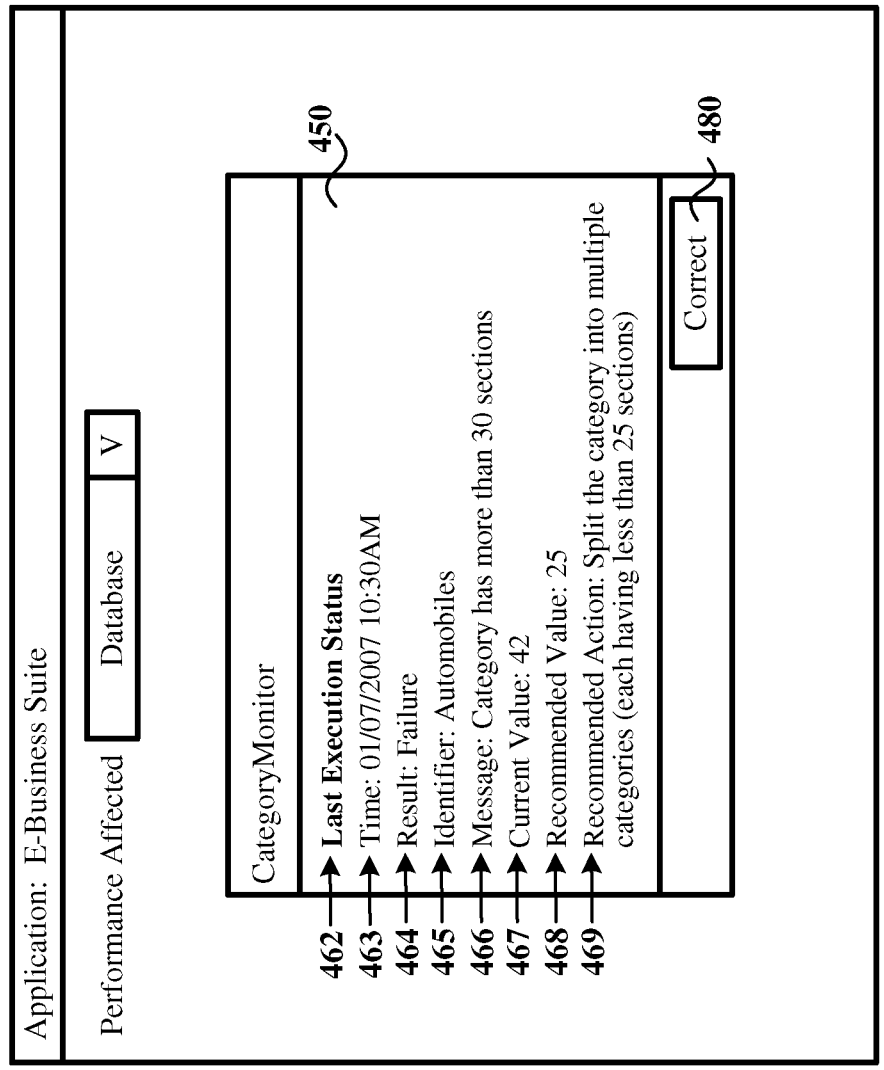
FIG. 4C depicts a portion of a screen displaying a result of comparing a current value of an application specific parameter (retrieved by executing a monitor program selected by a user) with a recommended value in an embodiment.

The description is continued assuming that the screens depicted in FIGS. 4A-4C are provided as web pages displayed using a browser on a display unit connected to admin system 160. Further, the screens described below may be presented with user interfaces and content different from the description, in ways well known in the relevant arts without deviating from the scope of the present invention.

Text 402 (labeled "Application") specifies the application ("E-Business Suite") for which optimal performance is desired. Select field 405 enables a user to select a group ("Database") of application specific properties associated with the application. When the "Database" group is selected, the application specific parameters for the group are displayed as table 410.

Table 410 depicts the various application specific properties (having associated monitor programs) included in the group ("Database") selected by the user. Each row is shown as having a single monitor program associated with each application specific parameter. However, multiple application specific parameters may be associated with a single monitor program and vice versa.

Column 412 (labeled "Name") specifies a name uniquely identifying each of the application specific properties and also the name of the associated monitor programs (as indicated in the square brackets). Column 414 (labeled "Description") provides information about each of the application specific properties. Column 416 (labeled "Impact") provides information about the effects on performance of the application in a scenario where each of the application specific properties is not setup for optimal performance of the application. Column 418 (labeled "Action") indicates a list of actions that a user/administrator may perform with the monitor program associated with each of the application specific properties.

Each of rows 420 and 425 depicts the details of an application specific property (having associated monitor program) included in the group "Database" selected by the user. In particular, row 425 depicts an application specific property uniquely identified by the name "SectionsPerCategory" having an associated monitor program named "CategoryMonitor" (as shown in column 412) which represents the number of sections present under each category of the catalog in the database (as described in column 414).

Further, row 425 indicates that too many sections under the same category will result in larger loading times during listing of categories in the catalog (as described in column 416) and has associated actions represented as links 426-428. Similarly row 420 depicts the details of another application specific property "OutdatedOrders" and its associated monitor program "OrderMonitor".

Link 426 (labeled "Start") enables a user to start execution of the associated monitor program. Link 427 (labeled "Schedule") enables a user to schedule the start of execution of the associated monitor program at a time specified by the user. Link 428 (labeled "More Info") enables a user to request more information about the associated monitor program such as the software instructions constituting the monitor program, specific information provided by the vendor of the application etc.

On a user selecting a monitor program (for example by clicking link 426), the selected program may be prepared for immediate execution. Alternatively, when a user clicks link 427, the user may be required to indicate a specific time at which the monitor program is to be executed, wherein the monitor tool 150 prepares the monitor program for execution only at the specific time indicated by the user. The description is continued assuming that the monitor program is prepared for immediate execution.

Thus, on a user/administrator selecting a monitor program, monitor tool 150 may then determine whether the selected monitor program requires any additional information for execution. For example, the monitor program "CategoryMonitor" may require details of a database server (such as user name, password, URL) on which the catalog data is maintained.

In one embodiment, the additional information required for execution of a monitor program is specified in form of a set of inputs. On determining that the selected monitor program requires a set of inputs, monitor tool 150 may generate an interface designed to accept values corresponding to the set of inputs. The generated interface may then be displayed to a user enabling the user to execute the selected monitor program as described in detail below.

6. Specifying Information Required for Execution

FIG. 4B depicts a portion of a screen enabling a user to specify values corresponding to inputs required for execution of a monitor program selected by a user in one embodiment. It may be appreciated that in alternative embodiments, monitor tool 150 may be suitably modified to accept a file (or a location of the file) containing the values corresponding to the set of inputs.

Display area 440 (titled "CategoryMonitor") represents an interface displayed in response to a user selecting a monitor program for immediate execution (for example, when a user selects link 426 in FIG. 4A). Button 460 (labeled "Monitor") enables a user to initiate execution of the selected monitor program with the specified values.

Display area 450 represents an interface generated to accept values corresponding to inputs required for execution of a monitor program ("CategoryMonitor") selected by a user. In particular, display area 450 is generated containing text fields 454 (labeled "Database User Name"), 456 (labeled "Database Password") and 458 (labeled "Database Server URL"). The text fields 454, 456 and 458 may accept values corresponding to the user name, password and the URL of the database server on which the catalog data is maintained.

The user name and password information represents authentication information which is required to access the data in a database server (not shown) accessible at the user specified URL. A monitor program (described below) may login to the database server using the authentication information, retrieve the data of interest and determine a current value (by appropriate computations, as needed) of the associated application specific parameter based on the retrieved data of interest.

The interface depicted in FIG. 4B may be appropriately modified to enable a user to schedule the execution of the selected monitor program at a future specified time instance(s). Further, the values corresponding to the set of inputs specified by the user may be stored in a volatile/non-volatile storage. At the time specified by the user, the stored values may be retrieved and used for executing the monitor program.

According to an aspect of the invention, the monitor program selected by a user is downloaded (by monitor tool 150) from an external system before execution. Monitor tool 150 may examine the configuration data to determine the location from which the selected monitor program is to be downloaded and/or executed. The location may specify an external system, for example, a URL of vendor system 130 or knowledge store 135 (along with any other information to identify the specific monitor program). Monitor tool 150 may then send requests to the external system and receive corresponding responses to enable downloading of the selected monitor program.

A copy of the downloaded monitor program may be maintained in a local storage (such as a file system or database server 180) and the configuration data appropriately modified, thereby enabling monitor tool 150 to execute the local copy on receiving further indications to execute the same monitor program.

Thus, the selected monitor program is downloaded and/or executed (with the additional information specified by the user) causing the current value of an associated parameter to be retrieved. The retrieved current value is then compared to a recommended value of the parameter and the result of the comparison is displayed as described below with examples.

7. Displaying Results

FIG. 4C depicts a portion of a screen displaying a result of comparing a current value of an application specific parameter (retrieved by executing a monitor program selected by a user) with a recommended value in an embodiment.

Display area 450 depicts the result of comparing a current value of the parameter "SectionsPerCategory" (retrieved on execution of the associated monitor program "CategoryMonitor") with a recommended value of the parameter. The result displayed in display area 450 may be dependent on the application specific parameter that is being determined. In one embodiment, display area 450 contains lines 462-468.

Line 462 "Last Execution Status" indicates that the information in lines 463-468 represent the result of comparing the current and recommended values of the parameter "SectionsPerCategory" when the associated monitor program was last executed. Line 463 "Time: 01/07/07 10:30 AM" indicates the date and time of last execution of the monitor program. Line 464 "Result: Failure" indicates the result of comparison as "failure" indicating that the current value does not match the recommended value.

Line 465 "Identifier: Automobiles" indicates the specific category "Automobiles" which caused a failure result. Line 466 "Message: Category has more than 30 sections" indicates the reason of failure, as the category "Automobiles" having more than the (recommended+tolerance) number of sections. Line 467 "Current Value: 42" indicates the actual number of sections in the category.

Line 468 "Recommended Value: 25" indicates the recommended number of sections in each category in the catalog. Line 469 "Recommended Action: Split the category into multiple categories (each having less than 25 sections)" indicates the corrective measure to be implemented in the application to cause optimal performance. A user/administrator may manually perform the recommended action/corrective measure of splitting the category "Automobiles" into multiple categories (each having less than 25 sections).

Button 480 (labeled "Correct") indicates the availability of a correction program designed to implement the above corrective measure. Button 480 may be enabled if the correction program is available and may be disabled otherwise. The user/administrator may select/click on button 480 indicating that the correction program is to be executed. On receiving such an indication, monitor tool 150 executed the correction program ensuring that the application specific parameter "SectionsPertCategory" is setup for optimal performance of the application.

Thus, a user/administrator may determine and correct application specific parameters setup for optimal performance of an associated application. During the determination and correction of parameters of interest, the monitor tool 150 may be required to download information such as details of the parameters (as depicted in FIG. 4A), monitor/correction programs associated with the parameters, recommended values of the parameters etc.

An aspect of the present invention facilitates maintenance of a configuration data specifying information associated with the application specific properties. The description is continued describing the manner in which configuration data is maintained in an embodiment.

8. Configuration Data

FIG. 5 depicts a portion of a configuration data (forming the basis for the display of FIGS. 4A-4C) specifying information associated with application specific properties of an application in an embodiment. Though the content is shown encoded in extensible markup language (XML) according to one convention, other encoding/formats and conventions may be used for representing the data.

Lines 521-566 (between tags "<parameters>" and "</parameters>") depict the various application specific parameters associated with the application "E-Business Suite" (as indicated by the attribute "application" in line 521). Each of lines 522-531, 532-542, 543-550 and 551-565 (between tags "<parameter>" and "") depicts the details of a corresponding application specific parameter.

Lines 551-565 depicts the details of an application specific parameter with unique name "SectionsPerCategory" belonging to the group "Database" (as indicated by the respective attributes "name" and "database" in line 551). Lines 552-554 (between tags "<description>" and "</description>") specify the description associated with the parameter indicating that the parameter "SectionsPerCategory" represents the number of sections present under each category of the catalog in the database.

Lines 555-558 (between tags "<impact>" and "</impact>") specify the impact of not configuring the parameter to the recommended value, that is, too many sections under the same category will result in larger loading times during the listing of the categories in the catalog.

Line 559 (tag "<recommended/>") specifies the recommended values for the parameter such as the minimum "1", maximum "25" with a tolerance of "5" (as indicated by the respective attributes "minimum", "maximum" and "tolerance" in line 559). Thus each category of the catalog should contain not less than "1" section and not more than "30" sections (maximum "25"+tolerance "5").

Lines 560-564 (between tags "<monitor>" and "</monitor>") depict the details of a monitor program associated with the application specific parameter "SectionsPerCategory", identified by the name "CategoryMonitor" and located at "http://www.acme.com/monitors/Catalog.jar" (as indicated by the respective attributes "id" and "location" in line 560). The location may indicate the URL of an external system such as vendor system 130 or knowledge server 135. It may be observed that the location also indicates the name of the file "Catalog.jar" to be downloaded.

Lines 561-563 depict the inputs required for execution of the monitor program. In particular line 561 (tag "<input/>") specifies an input with name "DbName", type "Text" and having a label "Database User Name" (as indicated by the respective attributes "name", "type" and "label" in line 561). Similarly, lines 562-563 specify other inputs required for execution of the monitor program.

It may be observed that the information depicted in the screen in FIG. 4A corresponds to the information depicted for the application specific parameters belonging to the "Database" group such as "OutdatedOrders" (lines 522-531) and "SectionsPerCategory" (lines 559-565) in the configuration data. In particular, row 425 corresponds to the information depicted in lines 559-558 (associated with the parameter "SectionsPerCategory").

Further, the interface depicted in FIG. 4B corresponds to an interface generated based on the inputs (lines 561-563) required for executing the monitor program associated with the parameter "SectionsPerCategory". In particular, the labels associated with text fields 454, 456 and 458 correspond to the values of the "label" attribute in lines 561-563.

On a user selecting the monitor program "CategoryMonitor" (by clicking link 426), the configuration data may be inspected to determine the location "http://www.acme.com/monitors/Catalog.jar" of the monitor program. The monitor program may then be downloaded and executed to cause retrieval of a current value of the parameter. The result of comparing the retrieved current value with a recommended value of the parameter is then displayed.

It may be observed that the display of the result in FIG. 4C corresponds to the comparison of the current value of the parameter "SectionsPerCategory" with the recommended value "30" (maximum "25"+tolerance "5") as specified in line 559. Thus, lines 466-468 in FIG. 4C may be generated based on the recommended values specified in the configuration data.

Thus, monitor tool 150 displays a set of monitor programs, downloads a selected monitor program, generates an interface designed to accept inputs required for execution of the selected monitor program, executes the monitor program and compares the current value of the parameter (associated with the selected monitor program) with a recommended value based on the configuration data (of FIG. 5).

It may be appreciated that the determination and correction of application specific parameters may be performed individually or in combination by monitor tool 150 and the monitor/correction programs associated with the application specific parameters.

In one embodiment implemented in Java™ environment, a program file (packaged in the form of an archive file) contains instructions for both determination and correction of an application specific property (implemented as different functions). Monitor tool 150 executes the program file (using a Java Virtual Machine) and invokes the determination function with the inputs specified by the user.

Monitor program 150 receives the result of comparison from the determination function and displays the result on a display unit. On receiving an indication that a correction program is to be executed, monitor tool 150 invokes the correction function contained in the same program file. The description is continued describing the manner in which a monitor/correction program is implemented in such an embodiment.

9. Monitor/Correction Program

FIG. 6 depicts a portion of a monitor/correction program associated with an application specific parameter in an embodiment. Though the software instructions are shown coded in Java™ programming language, other programming languages and other environments may be used for coding the monitor/correction program.

Lines 611-648 depicts software instructions contained in a class (monitor program) named "CategoryMonitor" (as indicated by line 611) associated with the application specific property "SectionsPerCategory" (as indicated by the configuration data). Line 611 also indicates that the class implements a "GenericMonitor" interface, which may necessitate that a determination function and a correction function be implemented in the class.

Lines 612-631 depict a function named "doVerification", which is invoked when monitor tool 150 requires determination of the application specific property "SectionsPerCategory". Lines 632-647 depict another function named "doCorrection", which is invoked when monitor tool 150 requires correction of a failure of the associated parameter.

Monitor tool 150 first invokes the determination function "doVerification" with the values of the inputs specified by the user and also the recommended values specified in the configuration data (as shown by the argument "args" in line 612).

In lines 613-615, the values corresponding to the inputs "DbName", "DbPwd", "DbUrl" required for execution are retrieved from the argument "args" and stored in the respective variables "dbname", "dbpwd" and "dburl". The values may correspond to the values specified by the user in text fields 454, 456 and 458 respectively. In lines 616-618, the recommended values for the parameter are retrieved from the argument "args" and stored in the respective variables "min", "max" and "tol". The recommended values may correspond to the values specified in line 559 of the configuration data.

In line 619, a query is created for finding the categories in the catalog (maintained in a "cat_sect" table), which has more than "max+tol" sections (as indicated by the section name "sect_name"). In lines 620-621, the query is executed and the result of the query is stored in the variable "rs". The result of the query contains the categories having more than the recommended (+tolerance) number of sections. However, the result can be based without considering a tolerance in alternative embodiments.

Lines 622-630 are repeated for each of the categories in the result of the query "rs". In line 623, an instance of the class "MonitorFailure" is created and initialized with the name of the application specific parameter "SectionsPerCategory". In lines 624-628, information about the failure of comparison (such as the category name, the reason of failure, the current value, the recommended value and the recommended action) is added and in line 629, the instance is added to a queue maintained internally by the "MonitorStatus" class.

Multiple instances of the "MonitorFailure" class may be added based on the number of times lines 622-630 are repeated, with each instance indicating a failure of comparing the current value of the parameter with the recommended value. After execution of the function, monitor tool 150 may inspect the queue of the "MonitorStatus" class for any instances of the "MonitorFailure" class and display the details of the failure on a display unit. If there are no instances of the "MonitorFailure" class in the queue (indicating that all the categories are optimized), monitor tool 150 may display a message indicating a successful result.

It may be observed that lines 465-469 displayed in display area 450 of FIG. 4C correspond to the information stored in an instance of the "MonitorFailure" class caused by execution of the software instructions in lines 624-628. A user/administrator may manually perform the recommended action of splitting the category into multiple categories each having a number of sections less than the recommended value. Alternatively, the user/administrator may indicate to monitor tool 150 to perform a correction program designed to implement the recommended action/corrective measure.

On receiving such an indication from a user, monitor tool 150 may invoke the correction function "doCorrection" with the values of the inputs specified by the user and also the instance of the "MonitorFailure" class indicating the failure that needs to be corrected (as shown by the respective arguments "args" and "mf" in line 632).

In lines 633-635, the values corresponding to the inputs "DbName", "DbPwd", "DbUrl" required for execution are retrieved from the argument "args" and stored in the respective variables "dbname", "dbpwd" and "dburl". The values may correspond to the values specified by the user in text fields 454, 456 and 458 respectively In lines 636-637, a query for retrieving all the section names ("sect_name") in the category specified by the failure instance "mf" (as indicated by "mf.id") is executed and the result of the query (containing all the section names) are stored in the variable "rs".

In lines 638-646, the sections contained in the category are moved into multiple new categories with each new category having the recommended number of sections. The new categories are named "cat-1", "cat-2" etc. where "cat" represents the name of the original category having sections more than the recommended value. Thus, the recommended action/corrective measure of splitting the category into multiple categories (reorganizing the data into multiple categories) having less than the recommended number of sections is achieved.

In line 638, a variable "count" for counting the sections in the result of the query is initialized to "0" and a variable "parts" for determining the name of the new categories is initialized to "1". In line 639, name of a new category created by concatenating the name of the original category, the string "-", and the value in the variable "parts" with the new name being stored in the variable "newcat". As such, the variable "newcat" contains the value "cat-1" where "cat" is the name of the original category (as indicated by "mf.id").

Lines 640-647 are executed for each section contained in the result of the query "rs". In line 641, a section (indicated by "rs.get("sect_name")") is moved from the original category (indicated by "mf.id") to the new category indicated by the variable "newcat". It may be observed that the movement of the section is achieved by invoking a function "AppDatabase.Catalog.moveSection" already present in the application, enabling the application to handle dependencies related to the movement of the section (for example, information in another table in the database may be required to be modified to ensure consistency of the data). Communication may be established with the application of interest using other techniques, even for the determination of the current value of an application specific parameter.

In general, when an application is designed to perform actions, which form the basis for a corrective measure, an appropriate interface may be exposed by the application to initiate the actions. The correction program may accordingly be designed to use the interface for causing the application to perform the actions, thereby implementing the desired corrective measure. It should be appreciated that the actions generally depend on the specific application and the application specific parameters.

In line 642, the value of the variable "count" is incremented and in line 643 the new value is compared with the recommended value (as indicated by "mf.recommendedValue"). Lines 644-645 are executed only when the value of the variable "count" is equal to the recommended value. Thus line 641 is executed repeatedly (without executing lines 644-645) for a number of times equal to the recommended value, thereby moving a first set of sections (equaling the recommended value) from the original category to the new category.

In the scenario that the value in the variable "count" equals the recommended value, lines 644-645 are executed. In line 644, the value of the variable "count" is set to "0", and the value of the variable "parts" is incremented by one. In line 645, the value in the variable "newcat" is replaced with a new name generated by concatenating the name of the original category, the string "-", and the new value in the variable "parts". Thus, on execution of lines 644-645, the value of the variable "count" is reset and a new category name (such as "cat-2" where "cat" is the name of the original category) is generated On further execution of the lines 640-647, the sections are now moved to the new category "cat-2", till the number of the sections in the new category reached the recommended value.

Lines 644-645 are then executed causing a further new category name (such as "cat-3") to be generated resulting in further sections being moved to the new category "cat-3". The above logic is repeated till all the sections in the result set "rs" have been moved from the original category.

Thus, correction program performs the recommended action/corrective measure of splitting the original category in to multiple categories each containing less than the recommended number of sections, thereby ensuring that the application specific parameters "SectionsPerCategory" for all the categories in the catalog in the database are setup for optimal performance of the application.

Though not shown, it may be appreciated that the correction program may provide a status to monitor tool 150, which then displays the status on a display unit. The status may indicate a successful implementation of the corrective measure or indicate errors encountered during implementation. A user/administrator may view the status to confirm implementation or to take further actions required when the status indicates errors.

The description is continued describing the manner in which monitor tool 150 is implemented in an embodiment.

10. Monitor Tool

Figure 7:
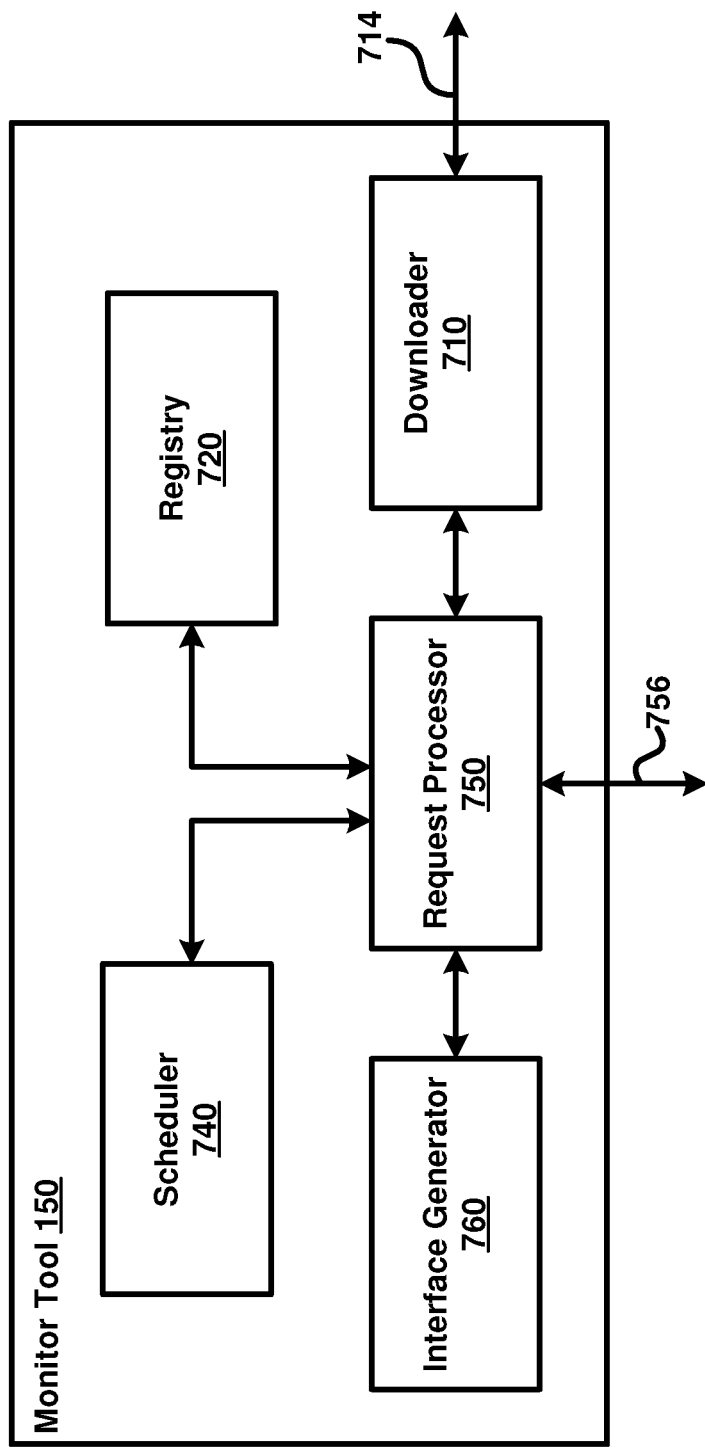
FIG. 7 is a block diagram illustrating the details of monitor tool 150 in an embodiment.

FIG. 7 is a block diagram illustrating the details of monitor tool 150 in an embodiment. The block diagram is shown with downloader 710, registry 720, scheduler 740, request processor 750 and interface generator 760. Though monitor tool 150 is shown above as being implemented in admin system 160, it should be appreciated that monitor tool 150 may be implemented in other systems (such as server systems 190A/190B, or client systems 101A/110B). In general, a system implementing one or more features of monitor tool 150 may be termed as a monitoring system. Each block of monitor tool 150 is described in detail below.

Downloader 710 receives requests for downloading information from an external system from request processor 750. Each request may specify the location of the external system (for example a URL of vendor system 130 or knowledge store 135) and the type of information (monitor/correction program, recommended values, or configuration data) to be downloaded.

On receiving one such request, downloader 710 may generate new requests (based on the protocol required by the network and/or external system) and send the generated requests to the external system via path 714. Downloader 710 then receives the responses to the requests and assembles the requested information based on the content of the responses. The assembled information is then sent as a response to request processor 750.

Registry 720 represents a buffer (in volatile/non-volatile memory) where information such as configuration data, monitor/correction programs, and recommended values downloaded from an external system are maintained by request processor 750. Registry 720 may also store the status of execution (indicating the result of comparison) of the monitor/correction programs.

Scheduler 740 receives requests for executing monitor programs at various times specified by users/administrators from request processor 750. Scheduler 740 maintains information (such as the name of the monitor program and the specific time) about the requested monitor programs, and checks at regular intervals for any monitor program that needs to be executed. On determining that a time specified for execution of a monitor program has been passed/reached, scheduler 740 may send an indication to request processor 750 indicating the name of the monitor program to be executed.

Interface generator 760 receives a request for generating an interface from request processor 750, for example, when a user is required to provide inputs (FIG. 4B). In such a situation, the request may specify information such as the name, type and label of the fields to be included in the interface. Interface generator 760 may then generate the interface according to a pre-defined specification (for example, as web pages) and send the generated interface as a response (to the request) to request processor 750. Alternatively, interface generator 760 may cause the display of an interface containing the requested fields on a display unit.

Request processor 750 receives a request (via path 756) for determining whether an application is operating with application specific parameters of interest setup for optimal performance of the application. The request may be received from a user/administrator using admin system 160 or one of server systems 190A-190B. Request processor 750 then inspects the information maintained in registry 720 for determining the details of the requested parameters. The details of the requested parameters are then sent (via path 756) for displaying on a display unit (connected to the requesting system).

In a scenario where details of the requested parameters (or in general, any requested information) are not available in registry 720, request processor 750 generates appropriate requests to downloader 710 indicating the information to be downloaded and the external system from which the information is to be retrieved. On receiving a response from downloader 710 containing the requested information, request processor 750 updates the information maintained in registry 720.

Request processor 750 then receives a request (via path 756) for executing a monitor program selected by the user/administrator. Request processor 750 then inspects information (such as configuration data) maintained in registry 720 to determine whether any inputs are required for execution of the selected monitor program.

If such information is required, request processor 750 retrieves the details of the inputs (such as name, type and label) from registry 720 and sends a request with the retrieved details to interface generator 760 for generating an appropriate interface. On receiving a generated interface from interface generator 760, request processor 750 sends the details of the interface (via path 756) for displaying on the display unit.

Request processor 750 then receives the values (corresponding to the inputs) specified by the user/administrator and prepares the monitor program for execution. If the request for execution of a selected monitor program contains a specific time at which the execution is to be performed, request processor 750 may store the received values in registry 720, and then send a request to scheduler 740 containing the name of the monitor program and the specific time of execution. On receiving an indication from scheduler 740 that the monitor program is to be executed, request processor 750 retrieves the values stored in registry 720 and prepares the monitor program for execution.

The preparation of the selected monitor program for execution may involve loading a run time environment into execution memory of admin system 160, converting the software instructions constituting the monitor program into an executable format, loading the executable format of the monitor program into execution memory, setting environment variables corresponding to the values received from the user and/or the value specified in the configuration data.

Request processor 750 then executes the monitor program and stores the status of execution (containing the result of comparing a current value of the associated parameter with a recommended value) in registry 720. The results of comparison may then be sent (via path 756) for displaying on the display unit.

Request processor 750 may then receive (via path 756) for performing a correction program associated with an application specific parameter. Request processor 750 may then prepare the correction program for execution similar to the monitor program, execute the correction program and store the status of execution in registry 720. The status of execution may then be sent by (via 756) for displaying on the display unit.

It should further be appreciated that the above-described features of monitor tool 150 may be implemented in a combination of one or more of hardware, software and firmware (though embodiments are described as being implemented in the form of software instructions). The description is continued with respect to an embodiment in which various features are operative by execution of corresponding software instructions.

11. Digital Processing System

Figure 8:
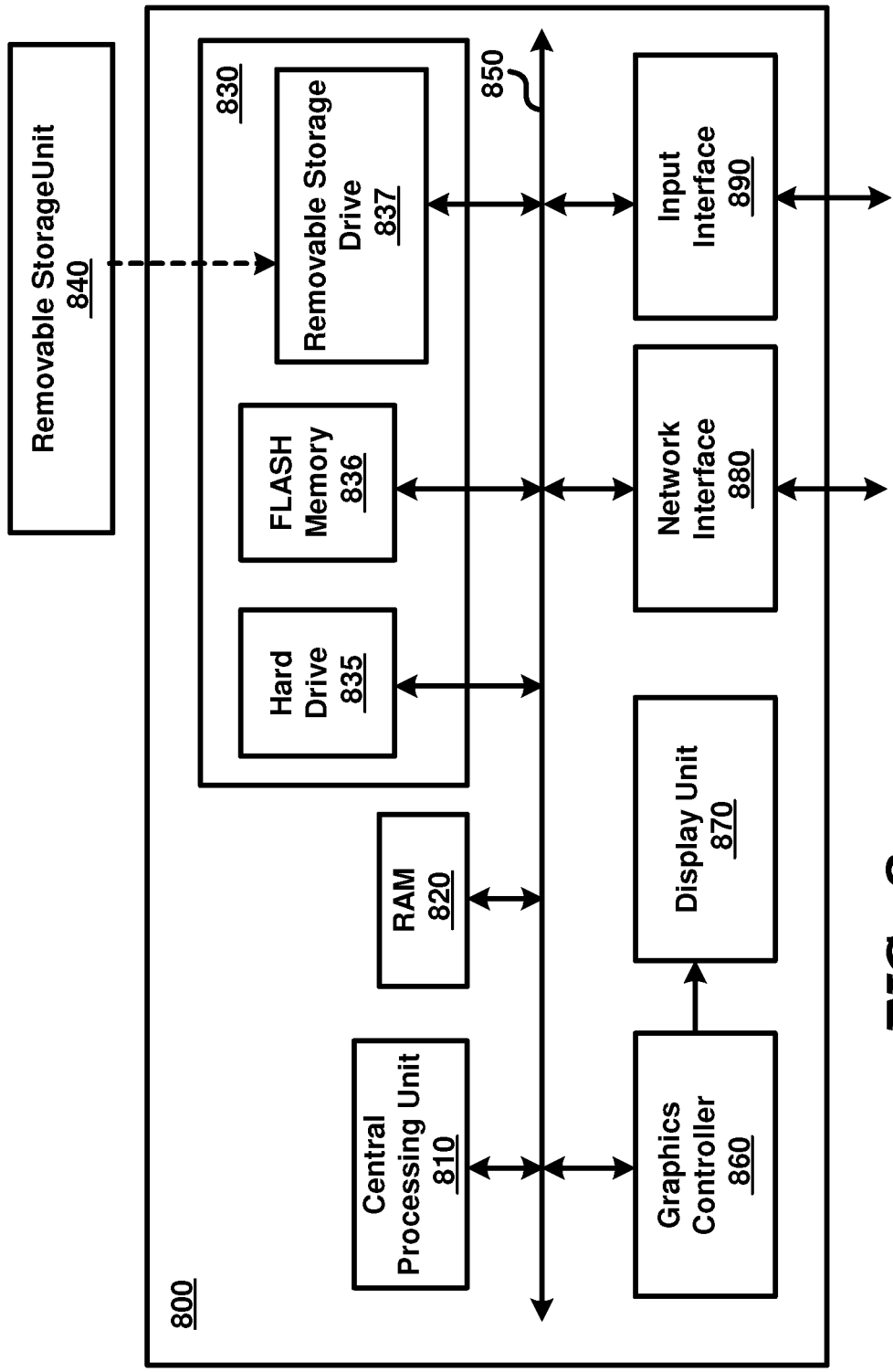
FIG. 8 is a block diagram illustrating the details of a digital processing system in which various aspects of the present invention are operative by execution of appropriate software instructions.

FIG. 8 is a block diagram illustrating the details of digital processing system 800 in which various aspects of the present invention are operative by execution of appropriate software instructions. Digital processing system 800 may correspond to any system (e.g., admin system 160) executing monitor tool 150.

Digital processing system 800 may contain one or more processors such as a central processing unit (CPU) 810, random access memory (RAM) 820, secondary memory 830, graphics controller 860, display unit 870, network interface 880, and input interface 890. All the components except display unit 870 may communicate with each other over communication path 850, which may contain several buses as is well known in the relevant arts. The components of FIG. 8 are described below in further detail.

CPU 810 may execute instructions stored in RAM 820 to provide several features of the present invention. CPU 810 may contain multiple processing units, with each processing unit potentially being designed for a specific task. Alternatively, CPU 810 may contain only a single general-purpose processing unit. RAM 820 may receive instructions from secondary memory 830 using communication path 850.

Graphics controller 860 generates display signals (e.g., in RGB format) to display unit 870 based on data/instructions received from CPU 810. Display unit 870 contains a display screen to display the images (e.g., portions of screens depicted in FIGS. 4A, 4B and 4C) defined by the display signals. Input interface 890 may correspond to a keyboard and a pointing device (e.g., touch-pad, mouse). Network interface 880 provides connectivity to a network (e.g., using Internet Protocol), and may be used to communicate with other connected systems (such as client systems 110A-110C and vendor system 170) of FIG. 1.

Secondary memory 830 may contain hard drive 835, flash memory 836, and removable storage drive 837. Secondary memory 830 may store the data (e.g., portions of data depicted in FIG. 5) and software instructions (e.g., portions of code depicted in FIG. 6), which enable digital processing system 800 to provide several features in accordance with the present invention.

Some or all of the data and instructions may be provided on removable storage unit 840, and the data and instructions may be read and provided by removable storage drive 837 to CPU 810. Floppy drive, magnetic tape drive, CD-ROM drive, DVD Drive, Flash memory, removable memory chip (PCMCIA Card, EPROM) are examples of such removable storage drive 837.

Removable storage unit 840 may be implemented using medium and storage format compatible with removable storage drive 837 such that removable storage drive 837 can read the data and instructions. Thus, removable storage unit 840 includes a computer readable storage medium having stored therein computer software and/or data. However, the computer (or machine, in general) readable storage medium can be in other forms (e.g., non-removable, random access, etc.).

In this document, the term "computer program product" is used to generally refer to removable storage unit 840 or hard disk installed in hard drive 835. These computer program products are means for providing software to digital processing system 800. CPU 810 may retrieve the software instructions, and execute the instructions to provide various features of the present invention described above.

12. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A method of determining whether application specific parameters are setup for optimal performance of corresponding applications, said method being performed in a digital processing system, said method comprising:

maintaining configuration data indicating that a plurality of monitor programs are associated with respective ones of a plurality of application specific parameters, wherein said configuration data indicates the corresponding monitor program associated with each application specific parameter, wherein each monitor program comprises a corresponding set of software instructions, which when executed, is designed to retrieve the current value and a recommended value of the associated application specific parameter, wherein said current value represents a value for the parameter using which said application is enabled to execute at a current time instance and wherein said recommended value represents an optimal value for said single parameter;

receiving from a user an identity of an application and a single parameter of said application, said application and said single parameter being respectively contained in said applications and said plurality of application specific parameters of said application;

identifying a monitor program among said plurality of monitor programs associated with said single parameter, wherein said identifying inspects said configuration data to identify that said monitor program is associated with said single parameter, wherein said identifying is performed in response to said receiving;

executing, upon said identifying, the corresponding set of software instructions comprised in said identified monitor program to cause said current value and said recommended value of said single parameter to be retrieved;

comparing said current value with said recommended value of said single parameter to determine whether said single parameter is setup for optimal performance of said application; and sending for display to said user, information representing a result of said comparing, wherein said identifying, said executing, said comparing and said sending are performed in response to, and upon said receiving of said identity of said application and said single parameter from said user such that said user can interactively determine whether desired individual ones of said application specific parameters are setup for optimal performance using said digital processing system.

2. The method of claim 1, further comprising downloading said recommended value from an external system coupled to said digital processing system via a network such that said recommended value is retrieved by said monitoring program without having to perform mathematical computations, wherein said comparing is performed after said downloading.

3. The method of claim 2, wherein said downloading downloads said monitor program from said external system on said network, in response to said identifying, wherein said executing said monitor program is performed after said downloading.

4. The method of claim 3, wherein said external system comprises a vendor system, wherein said monitor program and said recommended value are provided by a vendor of said application.

5. The method of claim 1, wherein said configuration data indicates a respective location for each of said plurality of monitor programs,
wherein said identifying inspects said configuration data to determine a first location of said monitor program,
wherein said downloading downloads the set of instructions constituting said monitor program from said first location, wherein said location contains a URL of said external system,
wherein said executing executes the downloaded set of instructions to retrieve the current value of said single parameter.

6. The method of claim 5, wherein said configuration data also specifies recommended values associated with respective ones of said plurality of application specific parameters, wherein said configuration data specifies that said recommended value is associated with said parameter.

7. The method of claim 1, wherein said identifying further comprises:
displaying a data identifying a plurality of monitor programs associated with said plurality of application specific parameters on a display unit; and
enabling a user to select said monitor program from said plurality of monitor programs, wherein said executing is performed in response to said user selecting said monitor program.

8. The method of claim 7, wherein said configuration data specifies a set of inputs required for said monitor program to retrieve said current value, said method further comprising:
generating an interface in response to said user selecting said monitor program, wherein said interface is generated to include respective fields for receiving corresponding values for said set of inputs specified in said configuration data as being required for said monitoring program to retrieve said current value;
displaying said interface, including said fields, on said display unit; and
enabling said user to specify a set of values corresponding to said set of inputs in said fields,
wherein said executing executes said monitor program with said set of values.

9. The method of claim 8, wherein said set of inputs comprise authentication information which enables said monitor program to access a database server, wherein said monitor program retrieves data from said database server using said authentication information and determines said current value based on the retrieved data.

10. The method of claim 1, further comprising displaying a result of said comparing on a display unit, wherein said result indicates a success or a failure of said comparing,
wherein said success indicates that said parameter is setup to cause optimal performance of said application and said failure indicates otherwise,
wherein said result further specifies a corrective measure to be implemented in said application to cause optimal performance of said application if said result indicates a failure.

11. The method of claim 10, wherein said result indicates said success only if said current value is within a tolerance from said recommended value.

12. The method of claim 1, further comprising:
executing a correction program designed to implement a corrective measure, wherein said corrective measure is designed to ensure that said parameter is setup to cause optimal performance of said application.

13. The method of claim 12, further comprising:
displaying a result of said comparing on a display unit;
indicating the availability of said correction program on said display unit; and
receiving an indication from a user that said correction program is to be executed, wherein said executing is performed in response to said indication.

14. The method of claim 12, wherein said application is designed to perform a set of actions forming the basis for said corrective measure and said correction program interfaces with said application to cause said application to perform said set of actions.

15. A computing system comprising:
a set of server systems executing a plurality of applications; and
a monitoring system determining whether an application contained in said plurality of applications is operating with an application specific parameter setup for optimal performance of said application, said monitoring system comprising one or more processors, which are designed to retrieve instructions from a memory and execute the retrieved instructions, to cause said monitoring system to perform the actions of:
maintaining configuration data indicating that a plurality of monitor programs are associated with respective ones of a plurality of application specific parameters, wherein said configuration data indicates the corresponding monitor program associated with each application specific parameter,
wherein each monitor program comprises a corresponding set of software instructions, which when executed, is designed to retrieve the current value of the associated application specific parameter;
receiving from a user an identity of said application and said application specific parameter;
identifying a monitor program associated with said application specific parameter, wherein said identifying inspects said configuration data to identify that said monitor program is associated with said application specific parameter, wherein said identifying is performed in response to said receiving;
executing, upon said identifying, the corresponding set of software instructions comprised in said identified monitor program to cause said current value of said application specific parameter and a recommended value to be retrieved; and comparing said current value with said recommended value of said application specific parameter to determine whether said application specific parameter is setup for optimal performance of said application; and sending for display to said user, information representing a result of said comparing, wherein said identifying, said executing, said comparing and said sending are performed in response to, and upon said receiving of said identity of said application and said parameter from said user such that said user can interactively determine whether desired application specific parameters are setup for optimal performance using said monitoring system.

16. The computing system of claim 15, further comprising:
a vendor system, coupled to said monitoring system via a network, providing for download of said monitor program associated with said application specific parameter, wherein said monitor program is designed to retrieve a current value for said application specific parameter, wherein said monitoring system downloads said monitor program from said vendor system in response to said user requesting a determination of whether said application specific parameter is setup for optimal performance of said application, and executes said monitor program to cause retrieval of said current value.

17. The computing system of claim 16, wherein said vendor system maintains a recommended value for each of said plurality of application specific parameters, wherein said monitoring system retrieves said recommended value from said vendor system before comparing said recommended value with said current value to determine whether said application specific parameter is setup for optimal performance of said application.

18. The computing system of claim 16, wherein said vendor system provides for download of a correction program designed to implement a correction measure in said application, wherein implementation of said corrective measure in said application ensures that said application specific parameter is setup for optimal performance of said application, wherein said monitoring program downloads said correction program from said vendor system and executes said correction program to ensure implementation of said corrective measure, thereby ensuring that said application specific parameter is setup for optimal performance of said application.

19. A non-transitory machine readable medium storing one or more sequences of instructions for causing a system to determine whether an application is operating with a plurality of application specific parameters setup for optimal performance of said application, wherein execution of said one or more sequences of instructions by one or more processors contained in said system causes said system to perform the actions of:

displaying data identifying a plurality of monitor programs associated with respective ones of said plurality of application specific parameters on a display unit, wherein each monitor program comprises a corresponding set of software instructions, which when executed, is designed to retrieve a current value of a corresponding application specific parameter;

enabling a user to select a monitor program from said plurality of monitor programs, wherein said monitor program is associated with a parameter contained in said plurality of application specific parameters;

downloading the corresponding set of software instructions comprised in said monitor program and a recommended value from an external system, wherein said downloading is performed in response to said user selecting said monitor program;

executing the corresponding set of software instructions comprised in said identified monitor program to cause a current value of said parameter to be retrieved;

comparing said current value with a recommended value of said parameter to determine whether said parameter is setup for optimal performance of said application; and displaying a result of said comparing on said display unit, wherein said identifying, said executing, said comparing and said displaying are performed in response to, and upon said enabling said user such that said user can interactively determine whether desired application specific parameters are setup for optimal performance using said system.

20. The non-transitory machine readable medium of claim 19, wherein said external system comprises a vendor system, coupled to said system via a network, wherein said monitor program and said recommended value are provided by a vendor of said application.

21. The non-transitory machine readable medium of claim 19, further comprising one or more instructions for:

maintaining a configuration data indicating monitor programs associated with each of said plurality of application specific parameters, wherein said displaying inspects said configuration data to determine said data for display, wherein said configuration data indicates a location of said monitor program, wherein said downloading downloads said monitor program from said location, wherein said location contains a URL of said external system, wherein said configuration data also specifies recommended values associated with respective ones of said plurality of application specific parameters, wherein said configuration data specifies that said recommended value is associated with said parameter.

22. The non-transitory machine readable medium of claim 19, further comprising one or more instructions for:

generating an interface in response to said user selecting said monitor program, wherein said interface is designed to accept a set of inputs required for executing said monitor program;

displaying said interface on said display unit; and enabling said user to specify a set of values corresponding to said set of inputs, wherein said executing executes said monitor program with said set of values.

23. The non-transitory machine readable medium of claim 19, wherein said result indicates a success or a failure of said comparing, wherein said success indicates that said parameter is setup to cause optimal performance of said application and said failure indicates otherwise, wherein said result further specifies a corrective measure to be implemented in said application to cause optimal performance of said application if said result indicates a failure.

24. The non-transitory machine readable medium of claim 19, further comprising one or more instructions for:

indicating the availability of a correction program on said display unit, wherein said correction program is designed to implement a corrective measure, wherein said corrective measure is designed to ensure that said parameter is setup to cause optimal performance of said application; receiving an indication from a user that said correction program is to be executed; and executing said correction program in response to said indication causing said corrective measure to be implemented in said application, thereby, ensuring that said parameter is setup for optimal performance of said application.

25. The non-transitory machine readable medium of claim 24, wherein said application is designed to perform a set of actions forming the basis for said corrective measure and said correction program interfaces with said application to cause said application to perform said set of actions.

26. The computing system of claim 15, wherein retrieval of the values of at least two application specific parameters requires corresponding different sets of software instructions such that the set of instructions comprised in a first monitor program associated with a first application specific parameter is different from the set of instructions comprised in a second monitor program associated with a second application specific parameter in terms of retrieving the corresponding value.

* * * * *

UNITED STATES PATENT AND TRADEMARK OFFICE
CERTIFICATE OF CORRECTION

Page 1 of 1

PATENT NO. : 8,572,593 B2
APPLICATION NO. : 11/853036
DATED : October 29, 2013
INVENTOR(S) : Vedula It is certified that error appears in the above-identified patent and that said Letters Patent is hereby corrected as shown below:

In the Drawings

On sheet 7 of 10, in figure 5, under Reference Numeral 525, line 1, delete "recommeded" and insert -- recommended --, therefor.

On Sheet 7 of 10, in figure 5, under Reference Numeral 560, line 1, delete "Monitot" and insert -- Monitor --, therefor.

In the Specification

In column 13, line 65, delete "respectively" and insert -- respectively. --, therefor.

In column 14, line 64, delete "generated" and insert -- generated. --, therefor.

In column 15, line 32, delete "101A/110B)." and insert -- 110A/110B). --, therefor.

Signed and Sealed this
Third Day of June, 2014

Michelle K. Lee
*Deputy Director of the United States Patent and Trademark Office*